May 25, 1943.  L. L. TROCHIM  2,319,832
PIPE HANGER
Filed April 16, 1941
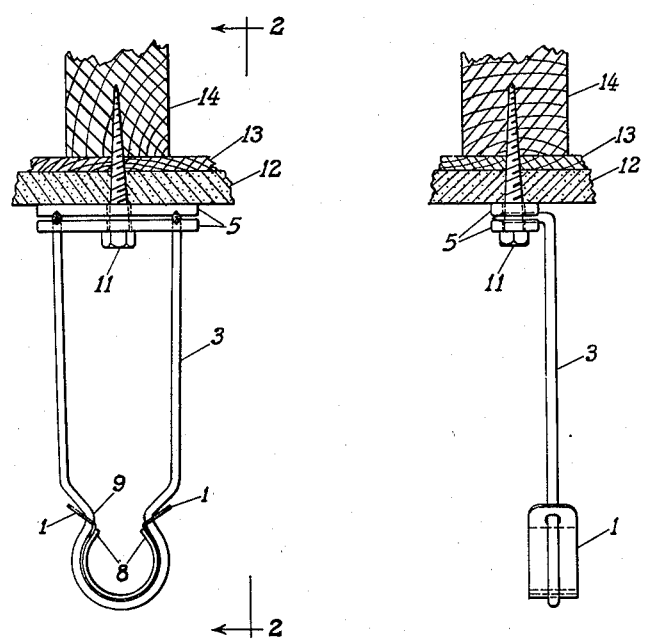
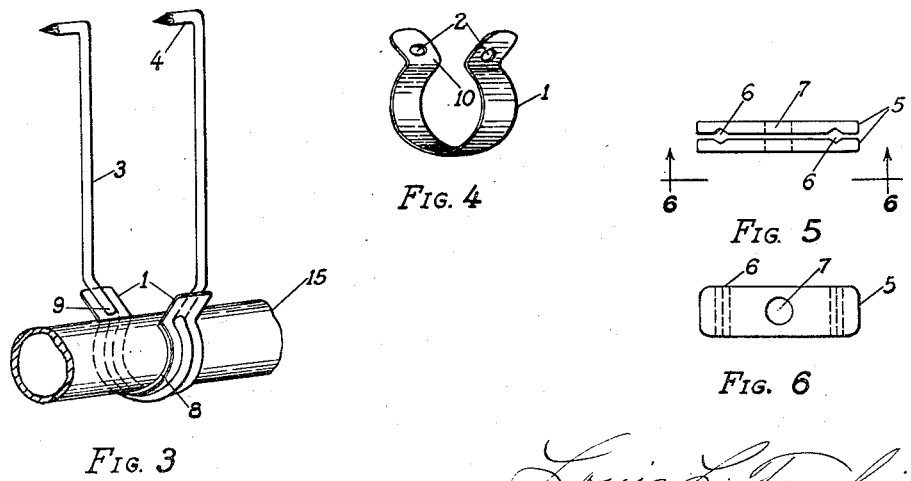
Louis L. Trochim
INVENTOR.

Patented May 25, 1943

2,319,832

UNITED STATES PATENT OFFICE 2,319,832

PIPE HANGER

Louis L. Trochim, Vallejo, Calif.

Application April 16, 1941, Serial No. 388,807

1 Claim. (Cl. 248—60)

My invention relates to pipe supporting means, and it has for its principal object the provision of a new and improved form and arrangement of parts by which a pipe may be supported securely in position. A further object is to provide a pipe hanger which will be neat appearing when in use and which may be produced, assembled, and applied with a minimum of labor, and may be taken down and re-applied very readily as often as may be required. Other objects will appear hereinafter specifically described. That which I believe to be new and desire to secure by Letters Patent is set forth in the claim.

In the drawing:

Fig. 1 is a face view of my improved pipe hanger in position for supporting a pipe beneath a plastered ceiling, Fig. 2 is a side view of the parts shown in Fig. 1, Fig. 3 is a perspective view of my improved hanger showing effect of engaging pipe, Fig. 4 is a perspective view of the spring steel cradle, Fig. 5 is a front view of the two part ceiling clamp, and, Fig. 6 is a top or bottom view of the two part ceiling clamp.

In the drawing in Figures 1 to 4, I have shown the best and most preferred manner of building my invention in which a spring metal band or cradle 1 of sufficient width to support a pipe is illustrated. The band must have sufficient stiffness to normally retain the loop form into which it is bent. Each end of the band is provided with a perforation 2 near the end thereof, through which perforations the supporting member 3 is passed. The supporting member is U-shaped in general form having the legs 3 provided with an inwardly bent area 9 adjacent the supporting band 1 with the top end of the band bent out at substantially the same angle, for supporting the pipe to be suspended by the device and to lock the pipe firmly in place when the device is in use. As shown in Fig. 1, each end of this cradle or band 1 is also bent at or near the perforations 2. The perforations 2 are to receive the wire legs 3 which are formed of various gauge wire according to size and weight of pipe supported. As is shown in Fig. 2, the wire legs 3 are bent at their extreme upper ends to form prongs 4. These prongs are adapted either to be driven into a wall or to enter into V-shaped slots 6 in ceiling clamp or plates 5. The central hole 7 in each plate 5 provides engagement means to secure complete hanger assembly into the ceiling by means of lagscrew or bolt 11 passed through hole 7 into concrete of plastered ceiling. For effecting the desired embracing of pipe 15 as shown in Fig. 3, I provide live rubber pipe engaging band 8 carried by spring steel clamps 1 and with the aid of my devised bend or lock 9 the pipe is firmly held so that the pipe 15 cannot be withdrawn from my improved hanger by a straight pull, it being necessary to spread the legs 3 of hanger apart to release pipe. For effecting desired locking around and firmly holding the pipe, I have provided the bends 9 in the wire hanger 3 and also for the purpose of reducing vibration. As shown in Fig. 4 the bends 10 of cradle 1 are also a part or means of locking hanger, and also for the purpose of an entrance of wire 3 into holes or perforations 2 and for permitting wire 3 to engage spring steel clamp 1 from the outside. Figs. 1 and 2 illustrate improved hanger assembled (minus pipe 15) against plastered ceiling, lag screw 11 being shown passed through ceiling clamps 5 through plaster 12, into the lath 13 joist 14. This improved hanger consists of 5 pieces such as (1) wire hanger 3, (2) spring steel clamp 1, (3) rubber engaging band 8 and ceiling clamp 5.

The simple object of my improved hanger is securely fastening of a hanger to ceilings of plaster, concrete, or any surface and can be used with all types of pipe and is submitted as an all purpose pipe hanger, in that it includes features which distinctly make this invention an improvement over any other type of pipe hanger heretofore invented in its advantages from production, installation and use.

It is understood that the form of my invention herein shown and described is to be taken as a preferred example of the device and that certain changes in the shape, size and arrangement of the parts may be made without departing from the spirit of the invention or the scope of the subjoined claim.

Having thus described my invention, I claim:

A pipe hanger formed of resilient wire like material bent in the form of a U, the legs of the U being bent inwardly adjacent the pipe, to form a loop having an opening less than a semicircle and adapted to clampingly receive a pipe, the ends of the legs being bent at substantially right angles and pointed to provide means for attaching the hanger to a support.

LOUIS L. TROCHIM.